(12) United States Patent
Thøgersen et al.

(10) Patent No.: US 7,077,615 B2
(45) Date of Patent: Jul. 18, 2006

(54) APPARATUS FOR LOADING AND UNLOADING A CARGO COMPARTMENT OF AN AIRCRAFT

(75) Inventors: Lars Thøgersen, Copenhagen (DK); James Stuart Wallace, Copenhagen (DK)

(73) Assignee: Rampsnake A/S, Kaserup (DK)

( * ) Notice: Subject to any disclaimer, the term of this patent is extended or adjusted under 35 U.S.C. 154(b) by 0 days.

(21) Appl. No.: 10/218,622

(22) Filed: Aug. 15, 2002

(65) Prior Publication Data

US 2004/0033126 A1    Feb. 19, 2004

(51) Int. Cl.
*B65G 43/08* (2006.01)

(52) U.S. Cl. .................. 414/346; 198/301; 414/435

(58) Field of Classification Search .............. 198/312, 198/315, 369.5, 370.1, 301; 414/344, 345, 414/346, 398, 399, 502, 503, 505; 244/137.1
See application file for complete search history.

(56) References Cited

U.S. PATENT DOCUMENTS

| | | | |
|---|---|---|---|
| 2,242,206 A | 5/1941 | Bissett | |
| 2,346,659 A | 4/1944 | Bruce | |
| 2,494,302 A | 1/1950 | Mason | |
| 2,988,190 A | 6/1961 | Tucker | |
| 2,990,938 A | 7/1961 | Sheehan | |
| 3,051,295 A | 8/1962 | Moy | 198/115 |
| 3,184,045 A | 5/1965 | Fry | 198/233 |
| 3,268,099 A | 8/1966 | Ajero et al. | |
| 3,356,236 A * | 12/1967 | Shaw et al. | 414/398 |
| 3,524,558 A | 8/1970 | Mastracci et al. | |
| 3,561,623 A * | 2/1971 | McCaul | 198/350 |
| 3,885,682 A * | 5/1975 | McWilliams | 414/789.8 |
| 4,164,338 A | 8/1979 | Myron | |
| 4,266,650 A | 5/1981 | Patel et al. | |
| 4,618,057 A | 10/1986 | Howser | |
| 4,620,629 A | 11/1986 | Dean | 198/836 |
| 4,871,057 A | 10/1989 | Aarts | |

(Continued)

FOREIGN PATENT DOCUMENTS

DE        37 03 969        4/1988

(Continued)

Primary Examiner—Eileen D. Lillis
Assistant Examiner—Charles A. Fox
(74) Attorney, Agent, or Firm—Finnegan, Henderson, Farabow, Garrett & Dunner, L.L.P.

(57) ABSTRACT

A ground apparatus for loading and unloading a cargo compartment of an aircraft. The apparatus comprises a frame, a first conveyor frame comprising a first conveyor with a flat cargo-engaging surface, a first actuator, a routing station for receiving cargo advanced thereto by the first conveyor, a second conveyor frame comprising a second conveyor with a flat cargo-engaging surface, a second actuator, a third conveyor, and controls for activating the third conveyor. The second conveyor frame is pivotally supported at the first end of the second conveyor so as to be sideways movable, and the third conveyor is arranged at the routing station. The routing station allows selective routing of the cargo received from the first conveyor onto the second conveyor or onto the third conveyor.

35 Claims, 4 Drawing Sheets

U.S. PATENT DOCUMENTS

| | | |
|---|---|---|
| 4,957,405 A | 9/1990 | Roberts et al. |
| 5,040,655 A | 8/1991 | Lacagnina |
| 5,191,965 A | 3/1993 | Scheid |
| 5,224,584 A | 7/1993 | Best et al. |
| 5,984,078 A * | 11/1999 | Bonnet .................... 198/370.1 |
| 6,005,211 A * | 12/1999 | Huang et al. ................ 209/583 |
| 6,006,893 A | 12/1999 | Gilmore et al. |
| 6,064,629 A * | 5/2000 | Stringer et al. ............. 367/128 |
| 6,164,892 A * | 12/2000 | Malloy et al. .............. 414/398 |
| 6,616,103 B1 * | 9/2003 | Marrero ................... 244/137.1 |

FOREIGN PATENT DOCUMENTS

| | | |
|---|---|---|
| EP | 0 457 938 A1 | 11/1991 |
| GB | 2 154 968 A | 9/1985 |
| WO | WO 88/02346 | 4/1988 |
| WO | WO 97/21589 | 6/1997 |
| WO | WO 01/44049 A1 | 6/2001 |

* cited by examiner

APPARATUS FOR LOADING AND UNLOADING A CARGO COMPARTMENT OF AN AIRCRAFT

BACKGROUND OF THE INVENTION

This invention relates generally to an improved apparatus for loading and unloading the cargo compartment of an aircraft. An example of a cargo handling apparatus is disclosed in international patent application no. WO01/51356.

Airport handling of cargo, such as passengers' suitcases, is normally carried out using ground transport vehicles that are loaded and unloaded at the airport terminal and then taken to the apron where another vehicle carrying a flat belt conveyor is used for moving the cargo between the level of the ground transport vehicle and the aircraft cargo compartment. The flat belt conveyor vehicle is moved to the aircraft upon its arrival at the apron and sits next to the aircraft during the unloading and subsequent loading of the aircraft. The passengers' luggage is manually carried between the ground transport vehicle and the flat belt conveyor vehicle by the apron staff.

Since some arriving passengers may be in transit, some cargo must be transferred directly to another aircraft rather than to the terminal, and since cargo belonging to some of the departing passenger may require delayed loading into the cargo compartment, specialized handling of the aircraft cargo is generally required at the apron. Conventional equipment has required any such special luggage to be picked out of the flow of cargo at the apron and be stacked directly on the ground. The apron staff then manually puts these items on the flat belt conveyor vehicle or on the ground transport vehicle at a later time.

Accordingly, the same piece of cargo normally weighing 10–20 kilos may at times be lifted manually twice and it follows that the complex cargo handling procedures at the apron add another burden on the apron staff involved in the physically exhausting task of transferring the heavy suitcases between the flat belt conveyor vehicle and the ground transport vehicle.

It is one object of the present invention to provide an improved conveyor vehicle for conveying cargo between a level close to the ground, such as the loading level of a ground cargo transport vehicle, and the aircraft cargo compartment which not only reduces the physical load on the apron staff when transferring the cargo to the ground transport vehicle but which also provides for an easier handling of specialized cargo which must be temporarily stored before loading into the aircraft or onto the ground transport vehicle or which is awaiting pickup for loading into another aircraft.

SUMMARY OF THE INVENTION

In accordance with the invention an improved ground apparatus for loading and unloading a cargo compartment of an aircraft has a frame including a first conveyor frame including a first conveyor with a cargo-engaging surface and a first end and a second end, a first actuator, for moving said first conveyor frame to a position wherein said first end of said first conveyor is at a selected elevated location with respect to said second end of said first conveyor, a routing station arranged at the level of said second end of said first conveyor, for receiving cargo advanced thereto by said first conveyor, a second conveyor frame including a second conveyor with a cargo-engaging surface, a first end arranged at the level of said routing station and a second end, a second actuator, for moving said second conveyor frame to a position wherein said second end of said second conveyor is at a selected elevated location with respect to said first end of said second conveyor, to allow discharge at said second end of said second conveyor of cargo advanced thereto by said second conveyor from said routing station, said second conveyor frame being pivotally supported at said first end of said second conveyor so as to be sideways movable, and a third conveyor having a first end and a second end, said first end of said third conveyor being arranged at said routing station, said routing station allowing selective routing of said cargo received from said first conveyor onto said second conveyor or onto said third conveyor.

On use, the second end of the second conveyor may be placed at a selected position by a sideways movement of the second conveyor frame combined with a vertical positioning of the second conveyor frame by means of the second actuator, and the apron staff may discharge cargo on top of a stack on a ground transport vehicle sitting next to the end of the second conveyor. Moreover, any pieces of luggage belonging to passengers in transit may be taken out of the flow of cargo and be pushed onto the third conveyor which provides for a temporary storage of cargo, with no need for actually lifting the transit luggage off the apparatus. The third conveyor is advanced stepwise in response to new pieces of cargo being placed thereon to leave room for a new piece of luggage to be placed on the third conveyor.

DETAILED DESCRIPTION OF THE PREFERRED EMBODIMENT

Figure 1:
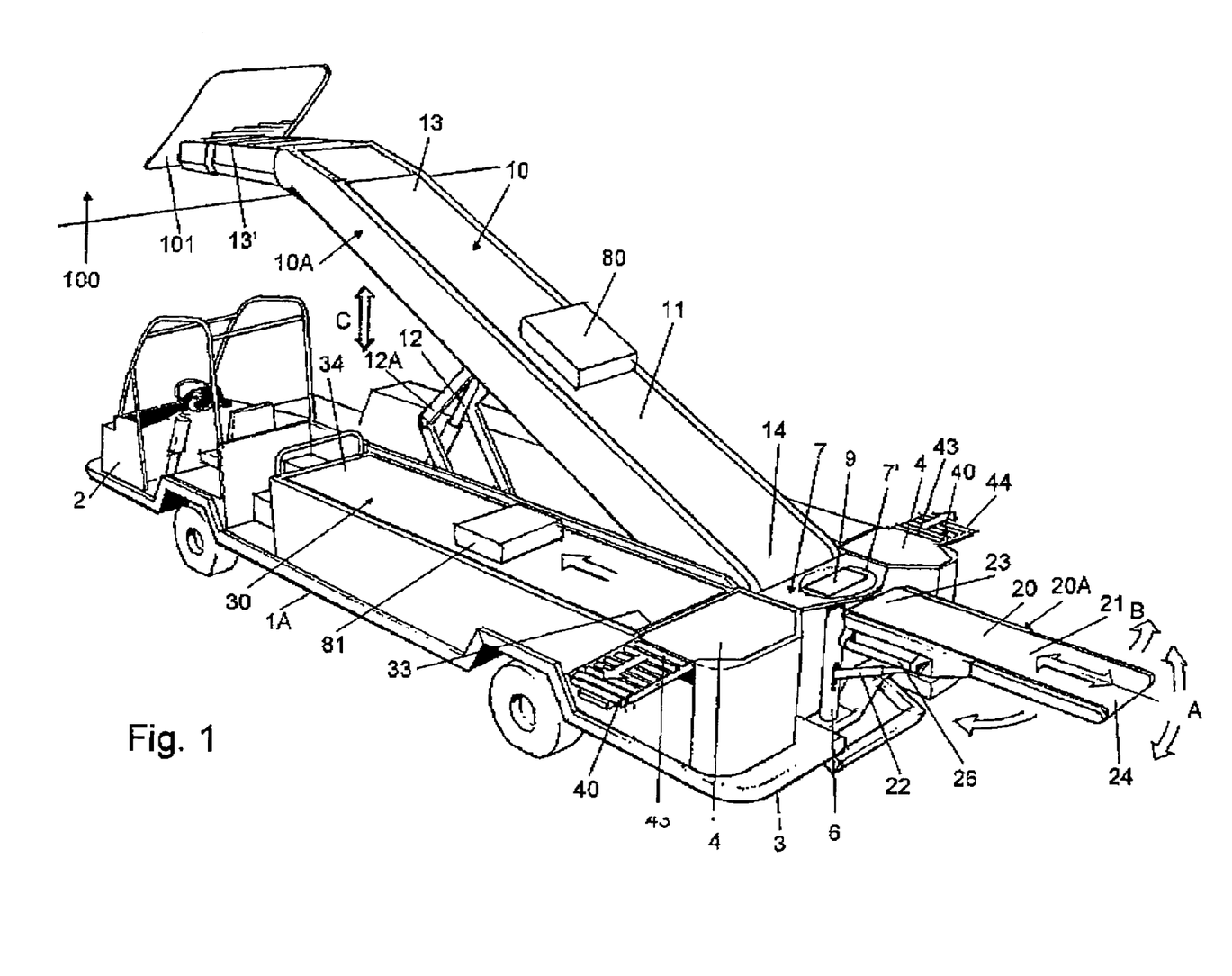
FIG. 1 shows a perspective view of the apparatus according to then invention in use.

FIG. 1 shows the ground apparatus 1 according to the invention in the form of a self-propelled unit including a frame 1A with a driver's cab 2 at a front end. In the drawing, the apparatus 1 is sitting next to an aircraft 100 with a cargo compartment. A normally closed cargo compartment opening 101 is shown.

The frame 1A of the apparatus carries a first conveyor frame 10A with a first conveyor 10 formed as a straight belt with a flat upper surface 11 adapted to engage cargo, such as suitcase 80, to be unloaded from the airplane or loaded onto to airplane 100. The first conveyor 10 has a first end 13 and a second end 14. The first conveyor frame 10A includes conventional means for supporting the first conveyor belt 10 as well as conventional means for driving the first conveyor belt 10 to thereby advance the cargo 80 between the first 13 and second 14 ends. The first conveyor frame 10A is connected to the ground apparatus frame 1A by an actuator 12 allowing the first conveyor frame 10A to be moved between a first position shown in FIG. 1 in which the first end 13 of the first conveyor belt 10 is at an elevated position with respect to the second end 14 and a second position shown in FIG. 2 wherein the first conveyor belt 10 is substantially at level. Preferably, the first conveyor frame 10A is pivotally connected to the frame 1A near the second end 14 of the first conveyor belt 10.

At the rear end 3 the frame 1A moreover carries a routing station 7 onto which cargo 80 is delivered by the first conveyor belt 10. The routing station 7 essentially is a flat platform situated at a height which allows a person standing on the ground next to the apparatus 1 to manually push or pull the cargo either laterally towards a series of further conveyors to be described below or to a second conveyor 20 carried by a second conveyor frame 20A and arranged in extension of the first conveyor belt 10. The level of the cargo-engaging surface 11 of the first conveyor belt 10 at the end 14 thereof is such that cargo 80, such as suitcases, is smoothly transferred onto platform 7.

At the rear end 3, the frame 1A carries a vertical column 6, which is mounted so as to be rotatable about a vertical axis. The column 6 carries a pneumatic or hydraulic actuator 22. The second conveyor frame 20A is pivotally connected to and supported by the column 6 to allow the second conveyor frame 20A to be swung up and down about a horizontal axis (direction A) between a raised operative position, such as shown in FIG. 1, and a non-operative position shown in FIG. 2. The second conveyor frame 20A is also connected to the actuator 22, which upon activation swings the second conveyor frame 20A about the aforementioned horizontal axis to the desired position and which supports the frame 20A and any cargo 80 thereon.

The second conveyor 20 is preferably formed as a straight belt with an upper flat load-engaging surface 21 and has a first end 23, which is essentially level with the platform 7 such that cargo may be run smoothly between the platform 7 and the second conveyor belt 20 in the raised position of the second conveyor belt frame 20A. The second conveyor frame 20A and the second conveyor belt 20 may be of the extendable type allowing for an increase in the length of the upper load-engaging surface 21, the distance between the second end 24 and the rear end 3 of the frame 1A being increased thereby.

Since cargo carried in the cargo compartment of an aircraft typically has certain minimum dimensions, any proper choice of design of the platform 7 and the conveyor frames 10A, 20A will ensure that the cargo does not fall off the apparatus during the transition to and from the platform 7.

Through the second conveyor frame 20A being supported by the rotatable column 6, the second conveyor frame 20A may be turned sideways in any raised position and within an angular interval of preferably about 60° in the directions indicated by arrow B in FIG. 1. By moving the second conveyor frame 20A with the second conveyor belt 20 in respective directions A and B, the extremity or second end 24 of the second conveyor belt 20 may be placed at a selected position for discharging cargo 80 moved by the second conveyor belt 20 from the first end 23. While the sideways movement of the second conveyor frame 20A is preferably obtained by the operator manually pulling the frame 20A in the desired direction using handgrips 26 and thereby rotating column 6, vertical positioning of the frame 20A in direction A is preferably obtained by means of the pneumatic or hydraulic actuator 22 which may be controlled by controls arranged on the handgrips 26. Accordingly, when the operator of the apparatus wishes to discharge cargo on top of a stack on a ground transport vehicle sitting next to the end 24 of the second conveyor 20 he will manoeuvre the second conveyor frame 20A such that the second end 24 of the belt 20 is placed at the location or which the cargo is to be discharged.

The platform 7 of the routing station includes two laterally arranged side platforms 4 located at a respective side of the apparatus 1, and the routing station 7 may preferably include guide means for guiding cargo received thereon in a specific direction. During the passage of the cargo through the routing station 7 the cargo may be shifted towards one of the side platforms 4 and, accordingly, towards any one of the further conveyors carried by the frame 1A.

In the preferred embodiment shown in FIG. 1, cargo engaging the guide means 9 is normally conveyed through the routing station 7 from the first conveyor belt 10 to the second conveyor belt 20. The guide means may include a small size conveyor 9 formed either as a driven endless conveyor belt with an upper cargo-engaging surface visible in FIG. 1 or as a series of driven, parallel rollers. Preferably, the small size conveyor is mounted in a rotatable disc 7' mounted in platform 7 and linked to the column 6 such that the aforementioned rotation of the column 6 about a vertical axis brings about a change in the direction of conveyance induced by the small size conveyor 9. In this manner, moving the second conveyor frame 20A along direction B, such as through 30° from a start position in extension of the first conveyor 10, may bring about a rotation of disc 7' of, say, 15°, to guide the cargo 80 towards the second conveyor belt 20 with a directional change. By optionally adapting the small size conveyor 9 to advance the cargo at less speed than the speed at which the cargo 80 is advanced by the first or second conveyor belts 10, 20, the apron staff may be given even more time to slip any special cargo onto the side platforms 4 of the routing station 7 and on to the further conveyors described below. The guide means 9 may be controlled by a sensor for automatically detecting the nature of the cargo advanced towards the routing station 7 and may be adapted for automatically guiding the relevant piece of cargo towards any one of the two side platforms 4.

Situated alongside the first conveyor frame 10A is a third conveyor 30 with a first end 33 and a second end 34 and which is supported by the frame 1A. The third conveyor 30 has an upper cargo-engaging surface and is adapted to convey cargo 81 between the rear part 3 and the front part of the apparatus 1, that is, in the same direction as cargo 80 conveyed by the first conveyor belt 10 although normally only in a horizontal or near horizontal plane. The apparatus 1 preferably includes controls for activating the third conveyor 30 when a piece of cargo 81 is placed thereon and to bring about a stepwise limited advancing of the cargo 81 towards the second end 34 of the third conveyor for temporary storage of the cargo 81 at a location distant from the first end 33. The controls may include a sensor, such as a photo-sensor, for automatically detecting the presence of cargo routed onto said third conveyor 30. The third conveyor 30 runs until the piece of cargo has moved out of the detection field of the sensor or for a predetermined time to a low for a new piece of cargo to be placed on the third conveyor in the detection field of the sensor in this manner, the third conveyor 30 may be used for the temporary storage on the apparatus 1 of cargo, such as suitcases, for a particular destination which is to be picked up at a later time or, alternatively, which is to be loaded on the aircraft at the end of the loading operation to be readily accessible within the cargo compartment.

Preferably, the apparatus 1 may also include a fourth conveyor 40 having a first end 43 and a second end 44, the first end 43 of the fourth conveyor 40 being arranged at the platform 4 such that the fourth conveyor for 40 communicates with the routing station 7. The fourth conveyor may be used for conveying cargo stored temporarily either on platforms 4 or on the third conveyor 30 to wards any ground cargo transport vehicle placed next to the sides of the apparatus 1.

Figure 3:
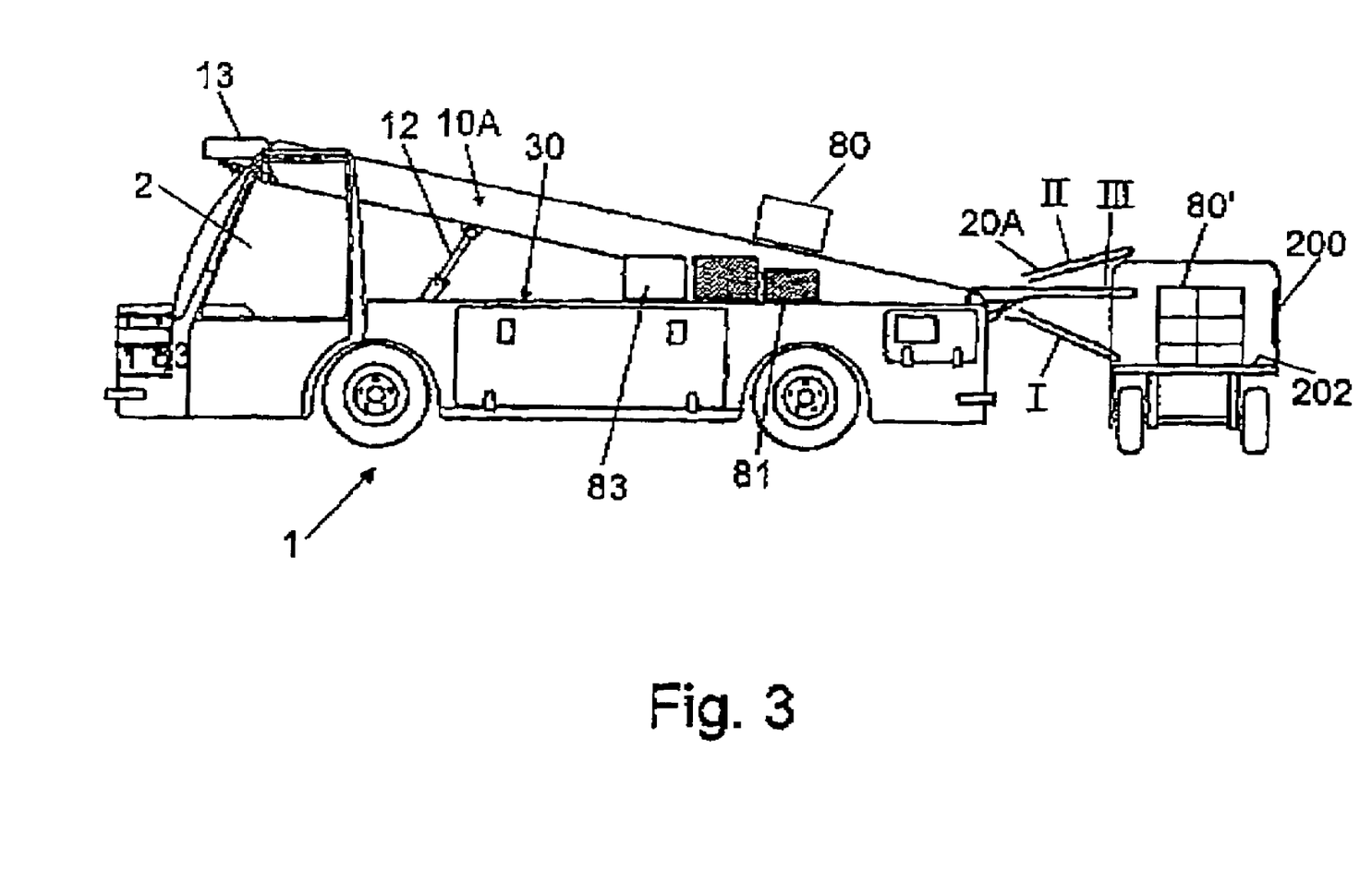
FIG. 3 shows the apparatus seen from one side in three different working situations.
Figure 4:
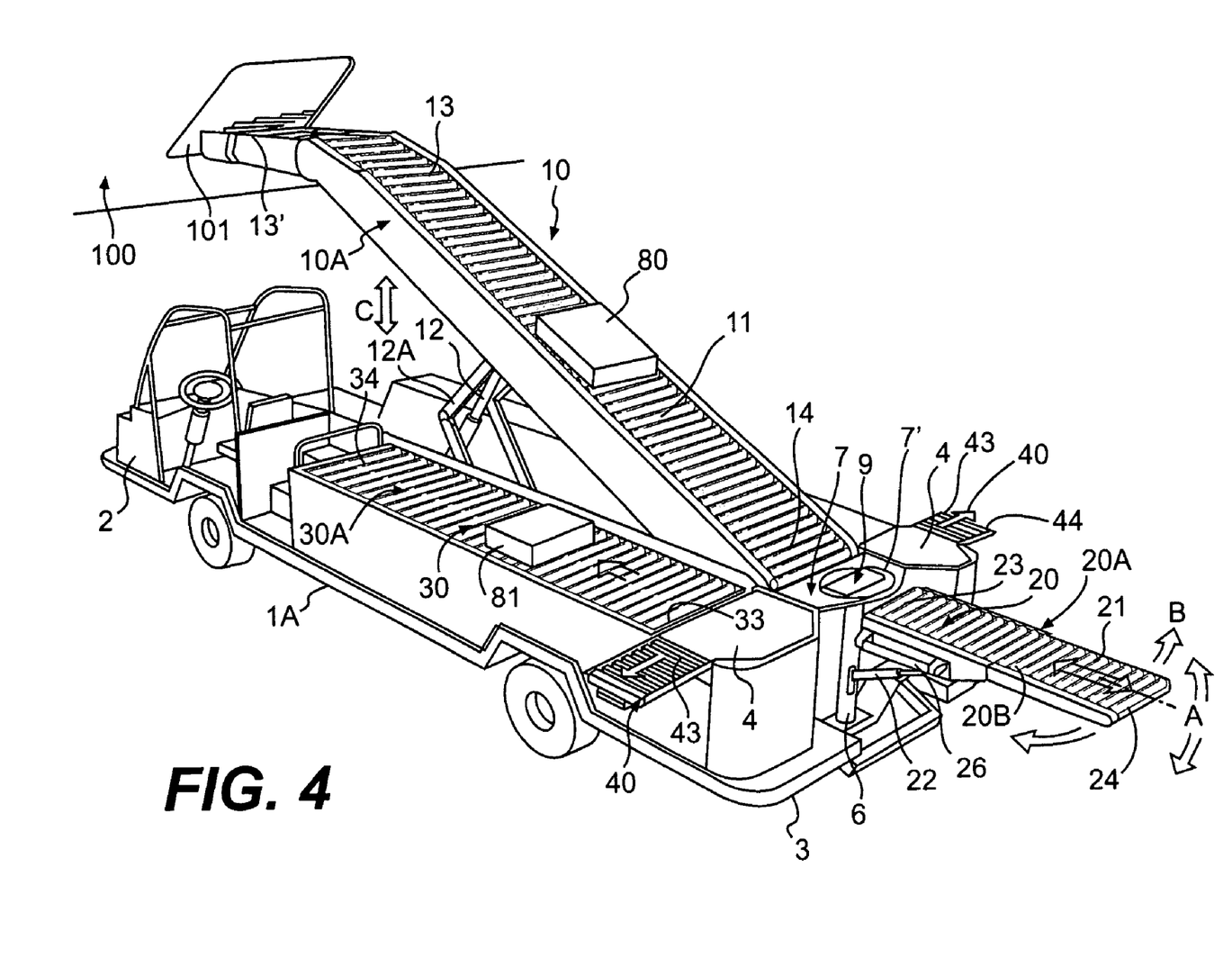
FIG. 4 is a perspective view of a non-limiting embodiment of the invention illustrating an apparatus wherein the cargo-engaging surfaces are supported by a succession of rollers.

FIG. 3 shows a ground cargo transport vehicle 200 sitting next to the end 3 of the apparatus 1 and illustrates three different positions of the second conveyor frame 20A, a first position I allowing suitcases 80 to be transferred directly onto the loading platform 202 of the ground cargo transport unit 200. In the second position II, the end of second conveyor frame 20A has been raised to an elevated position compared to position I to allow suitcase 80 to be discharged on top of suitcase 80'. Following completion of one stack, the second conveyor frame 20A is moved sideways along any of directions B shown in FIG. 1 to allow discharge of further suitcases next to the stack already on the unit 200. Discharging the suitcases may be facilitated by extending the second conveyor belt 20, the length of the second conveyor belt 20 being controllable by controls arranged on the handgrips 26. Accordingly, the unloading and loading process requires only a limited physical effort on behalf of the ground staff.

During the unloading process, the apron staff may pick out certain pieces of luggage belonging to passengers in transit from the flow of cargo and place those pieces on the third conveyor 30, which provides for a temporary storage of cargo. The third conveyor 30 is advanced stepwise in response to new pieces of cargo being placed thereon to leave room for a new piece of luggage to be placed on the third conveyor, and generally has a capacity corresponding to the distance between first end 33 and second end 34 since cargo 83 first placed on the third conveyor 30 at the first end 33 and advanced to the front end of the apparatus near the cab 2 generally cannot be moved any further.

Figure 2:
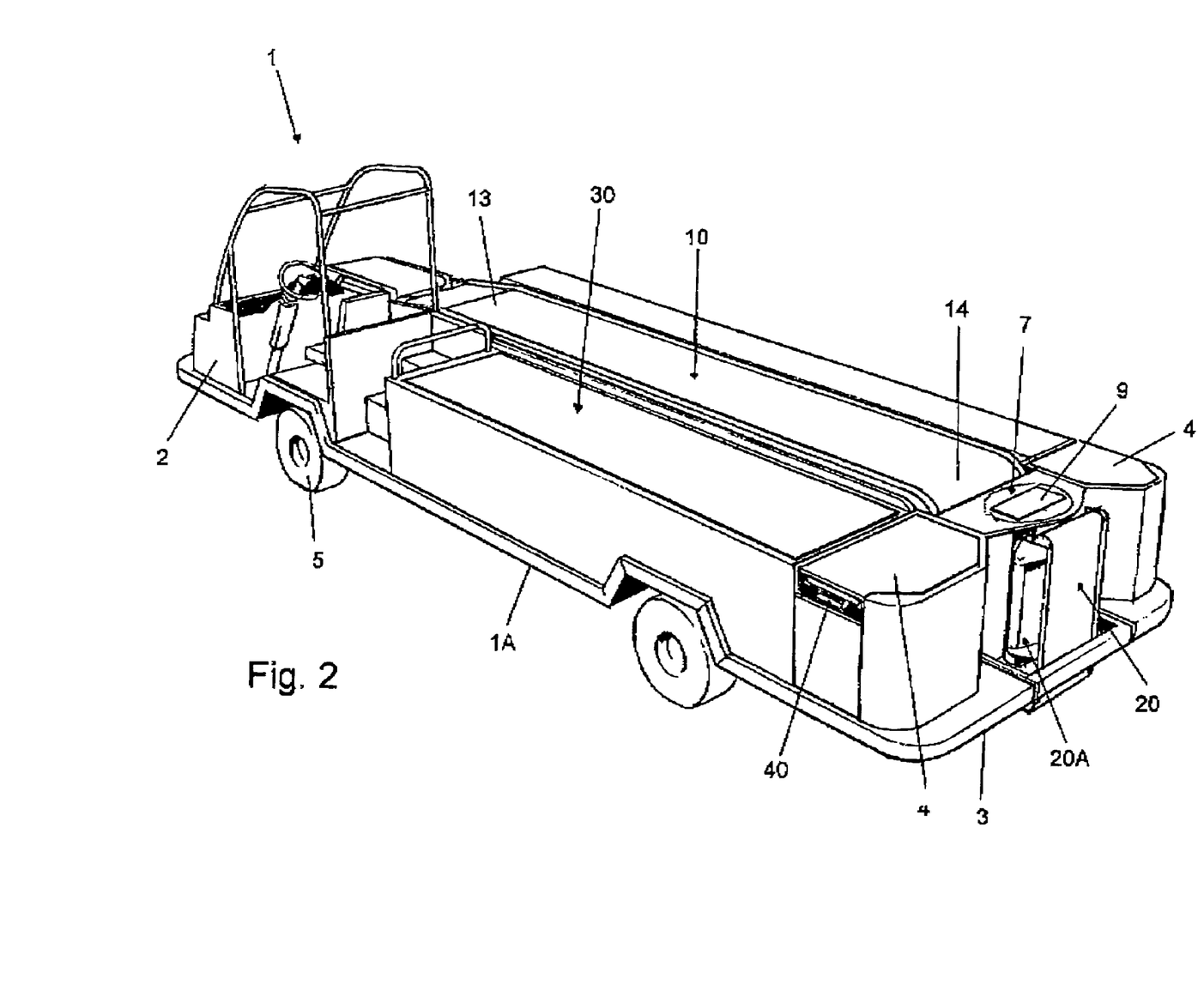
FIG. 2 shows a perspective view of the apparatus according to the invention in a non-operative state where the apparatus may be moved from one location in an airport to another.

Preferably, in the non-operative positions of the first conveyor frame 10A and of the second conveyor frame 20A shown in FIG. 2, the apparatus 1 has an overall width and length dimension of preferably no more than 3 by 10 meters whereby the apparatus may easily be shifted from one to another location in the airport.

We claim:

1. A ground apparatus for loading and unloading a cargo compartment of an aircraft, said apparatus comprising:
    a frame;
    a first conveyor frame comprising a first conveyor with a cargo-engaging surface and a first end and a second end;
    a first actuator for moving said first conveyor frame to a position wherein said first end-of said first conveyor is at a selected elevated location with respect to said second end of said first conveyor;
    a routing station arranged at the level of said second end of said first conveyor for receiving cargo;
    a second conveyor frame comprising a second conveyor with a cargo-engaging surface, a first end arranged at the level of said routing station and a second end;
    a second actuator for moving said second conveyor frame to a position wherein said second end of said second conveyor is at a selected height with respect to said first end of said second conveyor to allow discharge at said second end of said second conveyor of cargo advanced thereto by said second conveyor from said routing station, said second conveyor frame being pivotally supported at said first end of said second conveyor so as to be sideways movable;
    a third conveyor with a cargo-engaging surface and a first end and a second end, said first end of said third conveyor being arranged at said routing station, said routing station allowing selective routing of said cargo received from said first conveyor onto said second conveyor or onto said third conveyor; and
    controls for activating said third conveyor in response to the presence of cargo routed onto said third conveyor, said third conveyor stepwise advancing cargo routed onto said third conveyor towards said second end of said third conveyor for the temporary storage of said cargo on said third conveyor at a location distant from said first end of said third conveyor.

2. A ground apparatus according to claim 1, said routing station comprising guide means for guiding said cargo received by said routing station from said first conveyor to another conveyor.

3. A ground apparatus according to claim 1, said routing station comprising a routing station conveyor for engaging said cargo received by said routing station from said first conveyor and for conveying said cargo towards another conveyor.

4. A ground apparatus according to claim 3, wherein said first conveyor is adapted to advance said cargo at a speed greater than the speed at which said cargo is advanced by said routing station conveyor.

5. A ground apparatus according to claim 1, said controls comprising a sensor detecting the presence of cargo routed onto said third conveyor.

6. A ground apparatus according to claim 1, said frame of said apparatus comprising a locking mechanism separate from said respective actuators for maintaining each of said first and second conveyor frame in said elevated position.

7. A ground apparatus according to claim 1, wherein said selective routing is carried out manually.

8. A ground apparatus according to claim 1, said routing station comprising at least one side platform for the temporary collection of cargo, and a fourth conveyor having a first end and a second end, said first end of said fourth conveyor being arranged at said side platform of said routing station.

9. A ground apparatus according to claim 1, said frame comprising wheels for supporting said apparatus on the ground, and a drive unit for advancing said apparatus across the ground, said frame having a width not exceeding 3 meters and a length not exceeding 10 meters.

10. A ground apparatus according to claim 1 wherein said cargo-engaging surfaces are formed by a straight flat belt extending from said respective ends of said conveyors.

11. A ground apparatus according to claim 1 wherein said cargo-engaging surfaces are formed by a succession of rollers rotating about parallel axes and defining a straight direction of conveyance.

12. A ground apparatus for loading and unloading a cargo compartment of an aircraft, said apparatus comprising
    a frame;
    a first conveyor frame comprising a first conveyor with a cargo-engaging surface and a first end and a second end;
    a first actuator for moving said first conveyor frame to a position wherein said first end of said first conveyor is at a selected elevated location with respect to said second end of said first conveyor;
    a routing station arranged at the level of said second end of said first conveyor for receiving cargo advanced thereto by said first conveyor, said routing station comprising at least one side platform for the temporary collection of cargo;

a second conveyor frame comprising a second conveyor with a cargo-engaging surface, a first end arranged at the level of said routing station and a second end;

a second actuator for moving said second conveyor frame to a position wherein said second end of said second conveyor is at a selected height with respect to said first end of said second conveyor to allow discharge at said second end of said second conveyor of cargo advanced thereto by said second conveyor from said routing station, said second conveyor frame being pivotally supported at said first end of said second conveyor so as to be sideways movable;

a third conveyor with a cargo-engaging surface and a first end and a second end, said first end of said third conveyor being arranged at said routing station, said routing station allowing selective routing of said cargo received from said first conveyor onto said second conveyor or onto said third conveyor; and a fourth conveyor having a first end and a second end, said first end of said fourth conveyor being arranged at said at least one side platform.

13. The ground apparatus according to claim 12, said routing station comprising guide means for guiding said cargo received by said routing station from said first conveyor to another conveyor.

14. The ground apparatus according to claim 12, said routing station comprising a routing station conveyor for engaging said cargo received by said routing station from said first conveyor and for conveying said cargo towards another conveyor.

15. The ground apparatus according to claim 14, wherein said first conveyor is adapted to advance said cargo at a speed greater than the speed at which said cargo is advanced by said routing station conveyor.

16. The ground apparatus according to claim 12, said apparatus comprising controls for activating said third conveyor in response to the presence of cargo routed onto said third conveyor, said third conveyor stepwise advancing cargo routed onto said third conveyor towards said second end of said third conveyor for the temporary storage of said cargo on said third conveyor at a location distant from said first end of said third conveyor.

17. The ground apparatus according to claim 12, said controls comprising a sensor detecting the presence of cargo routed onto said third conveyor.

18. The ground apparatus according to claim 12, said frame of said apparatus comprising a locking mechanism separate from said respective actuators for maintaining each of said first and second conveyor frame in said elevated position.

19. The ground apparatus according to claim 12 wherein said selective routing is carried out manually.

20. The ground apparatus according to claim 12, said frame comprising wheels for supporting said apparatus on the ground and a drive unit for advancing said apparatus across the ground, said frame having a width not exceeding 3 meters and a length not exceeding 10 meters.

21. The ground apparatus according to claim 12, wherein said cargo-engaging surfaces are formed by a straight flat belt extending from said respective ends of said conveyors.

22. The ground apparatus according to claim 12, wherein said cargo-engaging surfaces are formed by a succession of rollers rotating about parallel axes and defining a straight direction of conveyance.

23. A self- propelled ground apparatus for loading and unloading a cargo compartment of an aircraft, said apparatus comprising:

a frame comprising wheels for support;

a first conveyor frame comprising a first conveyor with a cargo-engaging surface and a first end and a second end;

a first actuator for moving said first conveyor frame to a position wherein said first end of said first conveyor is at a selected elevated location with respect to said second end of said first conveyor;

a routing station arranged at the level of said second end of said first conveyor for receiving cargo advanced thereto by said first conveyor;

a second conveyor frame comprising a second conveyor with a cargo-engaging surface, a first end arranged at the level of said routing station and a second end;

a second actuator for moving said second conveyor frame to a position wherein said second end of said second conveyor is at a selected height with respect to said first end of said second conveyor to allow discharge at said second end of said second conveyor of cargo advanced thereto by said second conveyor from said routing station, said second conveyor frame being pivotally supported at said first end of said second conveyor so as to be sideways movable;

a third conveyor with a cargo-engaging surface and a first end arranged at said routing station, and a second end.

24. A ground apparatus according to claim 23, said routing station allowing selective routing of said cargo received from said first conveyor onto a conveyor chosen from said second conveyor and said third conveyor.

25. A ground apparatus according to claim 23, said routing station comprising guide means for guiding said cargo received by said routing station from said first conveyor to another conveyor.

26. A ground apparatus according to claim 23, said routing station comprising a routing station conveyor for engaging said cargo received by said routing station from said first conveyor and for conveying said cargo towards another conveyor.

27. A ground apparatus according to claim 26, wherein said first conveyor is adapted to advance said cargo at a speed greater than the speed at which said cargo is advanced by said routing station conveyor.

28. A ground apparatus according to claim 24, said third conveyor including controls for activating said third conveyor, in response to the presence of cargo routed onto said third conveyor, said third conveyor stepwise advancing cargo routed onto said third conveyor towards said second end of said third conveyor for the temporary storage of said cargo on said third conveyor at a location distant from said first end of said third conveyor.

29. A ground apparatus according to claim 28, said controls comprising a sensor for detecting the presence of cargo routed onto said third conveyor.

30. A ground apparatus according to claim 23, said frame of said apparatus comprising a locking mechanism separate from said respective actuators for maintaining each of said first and second conveyor frame in position.

31. A ground apparatus according to claim 24, wherein said selective routing is carried out manually.

32. A ground apparatus according to claim 23, said routing station comprising a platform for the temporary collection of cargo, and a fourth conveyor having a first end and a second end, said first end of said fourth conveyor being arranged at said platform.

33. A ground apparatus according to claim 23, said frame having a width not exceeding 3 meters and a length not exceeding 10 meters.

34. A ground apparatus according to claim 23, wherein said cargo-engaging surfaces are formed by a straight flat belt.

35. A ground apparatus according to claim 23, wherein said cargo-engaging surfaces are formed by a succession of rollers rotating about parallel axes and defining a straight direction of conveyance.

* * * * *